US009223891B2

United States Patent
Law-How-Hung et al.

(10) Patent No.: US 9,223,891 B2
(45) Date of Patent: Dec. 29, 2015

(54) METHODS AND SYSTEMS FOR DYNAMICALLY GENERATING AND REUSING DYNAMIC WEB CONTENT

(75) Inventors: France Law-How-Hung, Mason, OH (US); Ramadurai V. Ram, Mason, OH (US)

(73) Assignee: Citicorp Credit Services, Inc. (USA), Sioux Falls, SD (US)

( * ) Notice: Subject to any disclaimer, the term of this patent is extended or adjusted under 35 U.S.C. 154(b) by 963 days.

(21) Appl. No.: 13/233,156

(22) Filed: Sep. 15, 2011

(65) Prior Publication Data

US 2013/0073606 A1    Mar. 21, 2013

(51) Int. Cl.
*G06F 15/16* (2006.01)
*G06F 17/30* (2006.01)
*H04L 29/08* (2006.01)
*G06F 9/44* (2006.01)

(52) U.S. Cl.
CPC ............ *G06F 17/30893* (2013.01); *G06F 8/38* (2013.01); *H04L 67/34* (2013.01)

(58) Field of Classification Search
CPC .......... H04L 67/02; H04L 67/34; H04L 67/42
USPC ................................................. 709/203, 217
See application file for complete search history.

(56) References Cited

U.S. PATENT DOCUMENTS

| | | | |
|---|---|---|---|
| 2002/0073155 A1* | 6/2002 | Anupam et al. | 709/205 |
| 2003/0009563 A1* | 1/2003 | Douglis et al. | 709/227 |
| 2004/0123238 A1* | 6/2004 | Hefetz et al. | 715/513 |
| 2004/0177147 A1 | 9/2004 | Joshi et al. | |
| 2008/0215998 A1 | 9/2008 | Moore et al. | |
| 2010/0023690 A1* | 1/2010 | Dewar | G06F 17/30902 711/118 |
| 2011/0106966 A1 | 5/2011 | Smit | |
| 2012/0016929 A1* | 1/2012 | Travieso et al. | 709/203 |

OTHER PUBLICATIONS

International Search Report and Written Opinion dated Sep. 17, 2012, issued in a co-pending PCT Application No. PCT/US12/44566, filed Jun. 28, 2012.

* cited by examiner

*Primary Examiner* — Jason Recek
(74) *Attorney, Agent, or Firm* — Johnson, Marcou & Isaacs, LLC; John M. Harrington, Esq.

(57) ABSTRACT

Methods and systems for generating and reusing dynamic web content involve, for example, automatically generating client-side code on a server at run time, and automatically downloading the client-side code to the client side at run time. The client-side code is executed on the client side to become a widget with dynamic behavior attributes displayed as a component of a web page on a display screen of a client-side computing device. Dynamic behavior of the client-side code may triggered via an event handler mechanism wherein properties of the client-side code are dynamically changed without affecting any other content on the web page. The widget may be redisplayed on a subsequent occasion with a change in the widget without regenerating the client-side code.

23 Claims, 4 Drawing Sheets

METHODS AND SYSTEMS FOR DYNAMICALLY GENERATING AND REUSING DYNAMIC WEB CONTENT

FIELD OF THE INVENTION

The present invention relates generally to the field of computer networks, and more particularly to methods and systems for generating and reusing dynamic web content.

BACKGROUND OF THE INVENTION

Currently, it is possible but not practical for a developer to reuse a component created by another developer. Thus, it is necessary for each developer to re-create or reinvent such components in a process that is time consuming and prone to errors. There is a present need for generating dynamic web content that can change its behavior according to business requirements and that can be created in a short time and reused repeatedly.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform methods and systems for generating and reusing dynamic web content described herein.

Embodiments of the invention propose methods and systems for generating and reusing dynamic web page components that involve, for example, automatically generating, using a server-side processor, client-side code on a server at run time; automatically downloading, using the server-side processor, the client-side code to the client side at run time; and executing the client-side code, using a client-side processor, on the client side to become a widget with dynamic behavior attributes displayed as a component of a web page on a display screen of a client-side computing device.

According to embodiments of the invention, automatically generating the client-side code on the server at run time may involve, for example, providing a tag that is executable on the server at run time to create the client-side code. Providing the tag that is executable on the server at run time to create the client-side code may involve, for example, embedding the tag within content for the web page using a content management system. In addition, providing the tag that is executable on the server at run time to create the client-side code may involve, for example, providing the tag that is executable on the server at run time to create client-side widget code.

In an aspect of embodiments of the invention, automatically generating the client-side code on the server at run time may involve, for example, automatically generating the client-side code on the server at run time that is executable on the client side. Automatically generating the client-side code on the server at run time that is executable on the client side may also involve, for example, automatically generating the client-side code on the server at run time that is executable on a client-side browser. Automatically generating the client-side code on the server at run time that is executable on the client-side browser may further involve, for example, automatically generating the client-side code by a tag at run time, the client-side code being executable on the client-side browser.

In another aspect of embodiments of the invention, automatically generating the client-side code by the tag at run time may involve, for example, automatically generating the client-side code by the tag at run time that is executable on the client-side browser as a component of the web page with dynamic behavior. Automatically generating the client-side code by the tag at run time may involve, for example, automatically generating the client-side code by the tag at run time that is executable on the client-side browser as the component of the web page with dynamic behavior that refreshes itself. Automatically generating the client-side code by the tag at run time may involve, for example, automatically generating rich Internet application code that is executable on the client-side browser as the component of the web page with dynamic behavior that refreshes itself.

In a further aspect of embodiments of the invention, automatically downloading the client-side code to the client side at run time may involve, for example, automatically downloading multiple functions in the client-side code simultaneously to the client side using a non-blocking mechanism. In such aspect, automatically downloading the multiple functions in the client-side code simultaneously to the client side using the non-blocking mechanism may involve, for example, automatically downloading the multiple functions in the client-side code simultaneously to the client side using a JavaScript non-blocking mechanism.

In an additional aspect of embodiments of the invention, executing the client-side code on the client side to become a widget displayed as a component of a web page may involve, for example, executing the code on the client side to become a widget displayed as a main body of the web page on the display screen of the computing device.

A still further aspect of embodiments of the invention may involve, for example, triggering dynamic behavior of the client-side code via the dynamic behavior attributes of the widget by an occurrence of at least one event. In such aspect, triggering the dynamic behavior of the client-side code via the dynamic behavior attributes of the widget by the occurrence of the at least one event may involve, for example, triggering the dynamic behavior of the client-side code by the occurrence of a user action on the web page. Triggering the dynamic behavior of the client-side code by the occurrence of the user action on the web page may involve, for example, triggering the dynamic behavior of a rich Internet application component by the occurrence of the user action on the web page. Triggering the dynamic behavior of the client-side code via the dynamic behavior attributes of the widget by an occurrence of the at least one event may involve, for example, dynamically changing properties of the client-side code on the server side based on the occurrence of the at least one event.

In the triggering dynamic behavior aspect, triggering the dynamic behavior of the client-side code via the dynamic behavior attributes of the widget by an occurrence of the at least one event may involve, for example, automatically updating content of the widget by the widget to reflect the occurrence of the at least one event. Automatically updating the content of the widget by the widget to reflect the occurrence of the at least one event may involve, for example, automatically updating content of the widget by the widget to reflect the occurrence of the at least one event without affecting any other content on the web page. Triggering the dynamic behavior of the client-side code via the dynamic behavior attributes of the widget by an occurrence of the at least one event may involve, for example, registering by the widget in an event handler mechanism for the occurrence of the at least one event.

Still another aspect of embodiments of the invention may involve, for example, redisplaying the widget as a component of the web page on a subsequent occasion without regenerating the client-side code. Redisplaying the widget as the component of the web page on a subsequent occasion without regenerating the client-side code may involve, for example, redisplaying the widget from the server as a component of the web page on the subsequent occasion with a change in the widget without regenerating the client-side code.

Embodiments of the invention may involve, for example, a non-transitory computer-readable storage medium with an executable program stored thereon for generating dynamic web page components in which the program instructs a microprocessor, for example, to perform the steps of automatically generating client-side code on a server at run time; automatically downloading the client-side code to the client side at run time; and executing the client-side code on the client side to become a widget with dynamic behavior attributes displayed as a component of a web page on a display screen of a client side computing device.

Other embodiments of the invention may involve, for example, a system for generating dynamic web page content that involves, for example, a server-side processor coupled to memory and being programmed for automatically generating client-side code on a server at run time and automatically downloading the client-side code to the client side at run time. Such embodiments may also involve, for example, a client-side processor coupled to memory and programmed for executing the client-side code on the client side to become a widget with dynamic behavior attributes displayed as a component of a web page on a display screen of a client-side computing device.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

Embodiments of the invention propose rich components, such as rich Internet application (RIA) components, that can be displayed on a page on the Internet for a business, such as a financial institution. Such components are sufficiently flexible that they can change their behavior according to business requirements. They are also fast in performance and do not require constantly being repeated. Instead, such components can be created in a short time and reused. Further, the business can control the change of behavior of such components.

Figure 1:
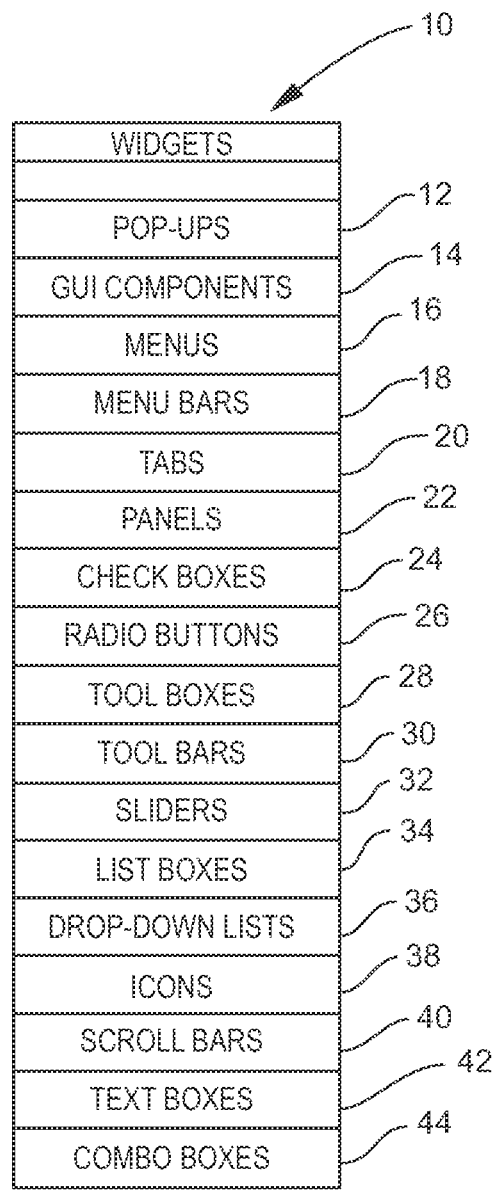
FIG. 1 is a table which illustrates examples of widgets for embodiments of the invention.

Components may include, for example, an overlay or a pop-up on an Internet web page displayed on a computer monitor. A component may be a graphical user interface component, such a menu or a tab or panel displayed on the web page. Such components may be referred to as widgets. FIG. 1 is a table which illustrates examples of widgets for embodiments of the invention. Referring to FIG. 1, such widgets 10 may include, without limitation, pop-ups 12, GUI components 14, menus 16, menu bars 18, tabs 20, panels 22, check boxes 24, radio buttons 26, tool boxes 28, tool bars 30, sliders 32, list boxes 34, drop-down lists 36, icons 38, scroll bars 40, text boxes 42, and combo boxes 44. Embodiments of the invention provide such components with dynamic behavior. Such dynamic behavior is an advantage provided by embodiments of the invention which is not found in typical components created using regular hypertext markup language (HTML).

Further, embodiments of the invention provide such components that can be reused by multiple developers. Currently, it is possible, but impractical, for a developer to reuse a component created by another developer. Thus, it is necessary for each developer to re-create or reinvent such components in a process that is time consuming and prone to errors. Embodiments of the invention provide components that are embedded and encapsulated into tags and can be reused by multiple developers. Such components are well wrapped together and can be captured repeatedly. Embodiments of the invention provide high quality components that are embedded with dynamic data.

Figure 2:
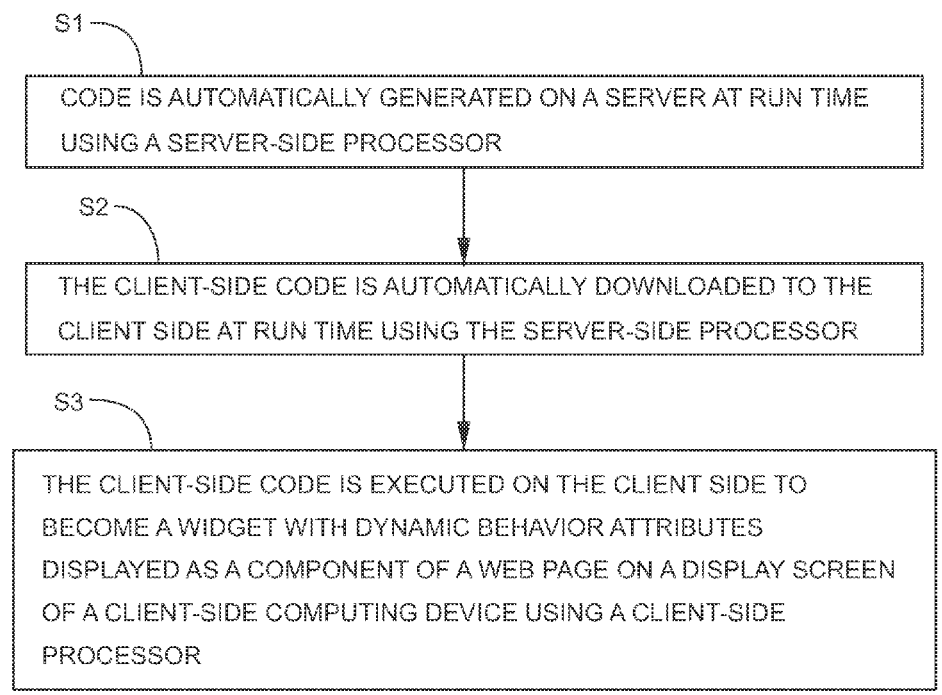
FIG. 2 is a flow chart which illustrates an example of the process of generating dynamic web content for embodiments of the invention.

Aspects of embodiments of the invention allow automated client-side code generation on the server side. FIG. 2 is a flow chart which illustrates an example of the process of generating dynamic web content for embodiments of the invention. Referring to FIG. 2, at S1, code is automatically generated on a server at run time using a server-side processor. At S2, the client-side code is automatically downloaded to the client side at run time using the server-side processor. At S3, the client-side code is executed on the client side to become a widget with dynamic behavior attributes displayed as a component of a web page on a display screen of a client-side computing device using a client-side processor.

Thus, at run time, client-side code is generated on the server side that is executed on the client side. For example, the client-side code is generated on the server and executed on the client-side browser at run time. Further, embodiments of the invention include an automated delivery mechanism at run time. Rather than creating and checking in a component which a developer can use later, the client-side code is automatically generated on the server side and delivered to the client side at run time. Once the code is generated the first time and delivered to the client side where it is executed and becomes a widget, the widget can be redisplayed in a subsequent page without the need to regenerate the code.

Embodiments of the invention may involve different levels of caching of the component. For example, one such level may involve caching the component by the client-side browser itself. Thus, if a user invokes the component again, the widget displays again directly without going to the server.

Another level of caching the component may involve caching by the server. If the user wants to display the widget again, for example, with a change, the component may be displayed from the server. When the widget is cached by the server, all of the code, or part of the code, that was generated may be displayed from the server. Depending, for example, on what, if any, part of the code is changed, all or part of the component may be displayed from the server without regenerating the code.

An aspect of embodiments of the invention is a dynamic rule based mechanism by which components may change the behavior of the widget. For example, a businesses website may be visited by customers having greater or lesser privileges. Likewise, the website may be visited by customers who are conversant in different languages or by customers with different types of business needs. Embodiments of the invention enable the business to specify dynamic attributes to deal with all different types of customers at run time which dynamic attributes are determined only when a user logs in. Such dynamic attributes may cause the widget to be displayed slightly differently. For example, the widget may be displayed larger or smaller or in different colors at run time. Further, the widget may be displayed with more or less elements for customers, depending on the customers' privileges.

As previously noted, a characteristic of the dynamic attributes mechanism for embodiments of the invention is that the widget behavior is in the control of the business. Thus, the different properties of each widget, such as color, size, number of elements and the like within the widget, are in the business' control. The business may exercise such control, for example, by using a content management system and an event handling mechanism to affect the behavior of a particular widget.

Still other aspects of embodiments of the invention allow widgets to be created by the business itself, as well as by developers. For example, developers may invoke tags and create widgets for code generation and dynamic behavior using a templating mechanism of the content management system. Similarly, a business may create a page on a content management system of which it has control and can create and embed widgets within the page content.

Embodiments of the invention provide different types of tags. One type of tag is at the disposal of a developer in the templating mechanism. Another type of tag with similar functionality is available for the business to embed in content. Embodiments of the invention may be integrated with a cross-browser library, such as JQuery. jQuery is a free cross-browser JavaScript® library designed to simplify the client-side scripting of HTML. The JavaScript® library is a library of pre-written JavaScript®, an object-oriented functional programming language.

In addition, embodiments of the invention may be pluggable to JQuery and may involve client-side invocation using a pluggable JQuery application programming interface. The widgets for embodiments of the invention may be invoked in the same way as any JQuery component is invoked. In a pluggable aspect of embodiments of the invention, a JavaScript® library may sit in the background. If a different JavaScript® library is desired, such different library may be plugged in its place. In such case, there is no application change and there is no impact on the particular application that invokes the widgets.

In embodiments of the invention, a business user at a terminal may have access to a content management system to which the user can log in and create web pages. The content management system may utilize data capture templates. For example, the business user may bring up a data capture template and create a page by filling in content on the data capture template. The business user may specify content, such as images, tags, links and the like, on the data capture template. The user may also include one or more widgets, such as a menu, a branding, an overlay, a pop up, or any other widget.

In order to include such widgets on the page, according to embodiments of the invention, the business user may embed a tag within the content at a desired location on the web page. The business user may also specify attributes for the tag which becomes a widget on the page. For example, a widget may be an element that pops up on the web page. The business user may specify the height and width of the widget. Further, the business user may embed one or more widgets within another widget. For example the business user may embed a widget, such as a radio button, within another widget. The foregoing are examples of characteristics that are attributes of a specific tag of a particular widget.

A business, such as a financial institution, may have a platform on which various types of self-service online banking applications are written that may be implemented on the web page. Embodiments of the invention may allow generation of JavaScript® code on the financial institution's platform server using JavaServer® Pages Standard Tag Library (JSTL) 2.0 tag files. JSTL 2.0 may be characterized as an industry standard for putting together certain types of tags. The tags for embodiments of the invention may leverage JSTL 2.0 tags, following that industry standard. Such tags may generate the JavaScript® code at run time but execute on the client-side browser that created the widget.

In embodiments of the invention, developers may create user interface widget code to be downloaded to the client browser or, optionally, as the main body of a page. As the code is generated, it is automatically downloaded. In addition to providing a tag that is executed at run time on the server side to create run code, embodiments of the invention may also provide a mechanism for sending the tag to the client-side browser. As noted, such mechanism may download the widget that is generated to the client browser and, optionally, as the main body of the page. As previously explained, developers may use a templating mechanism in a process referred to as client-side templating to create a page. For example, a main body of a page may be created or a widget may exist by itself. In either case, whichever is generated is automatically downloaded by the automated delivery mechanism at run time to the client.

The method for embodiments of the invention may allow a complete browser-side RIA code to be generated for use by the developer through JavaServer® Pages tags. A complete RIA code may be a widget that has functionality, as opposed to code that is essentially static and has no functionality. For example, a complete browser-side RIA code may be a code for a visual user interface component that is functional. RIA code may be a client-side component that has dynamic behavior and will refresh itself. Such code may refresh itself using, for example, asynchronous JavaScript® and extensible markup language (AJAX). AJAX is a group of interrelated web development methods used on the client side to create interactive web applications.

In the past, when a user clicked on an element on a page, the entire page was refreshed. Employing AJAX for embodiments of the invention, when the user clicks on an element on a page, only the particular element that was clicked on is refreshed, without changing anything else on the page. Thus, in embodiments of the invention when the user clicks on an element on the page, all of the content on the page remains the same except the element which was clicked on. Only the information that was provided by the element which was clicked on is refreshed. The widget for embodiments of the invention may employ RIA code, which allows data in in the widget to be refreshed dynamically without refreshing the entire page.

The tags for embodiments of the invention may be given a directive to cache all generated code grouped by an application identifier to be collected into a single unit of JavaScript® code. Once the code for embodiments of the invention is generated, the code may be cached and does not have to be generated again. When the tag is invoked, one of the parameters for the tag may be specified to ask whether to cache the code or not to cache it. Because the widget is dynamic and not static, it may do a number of different things. The user may want to continually reuse the code without having to generate it again. Accordingly, the widget for embodiments of the invention may be cached and reused.

On the other hand, assume that a user clicks on a widget on a web page and performs some action on the widget during a session. Assume also that the next time the widget is invoked, it will be changed slightly as a result of the user's action on it. In such case, it may be desirable to regenerate the widget based on the user's action. The developer or the business user will have been aware of that when creating the widget. Since the developer or business user will have known which widgets may be affected by a user's actions during a session, a determination can be made whether or not to cache such widgets at the time they are created. As previously noted, the code for embodiments of the invention may be cached in a server, such as a financial platform server, for everyone to be able to download it as a script file. Therefore RIA applications whose states never change may be cached and downloaded to a user's browser.

The method for embodiments of the invention may use non-blocking JavaScript® mechanisms to efficiently download and execute code in parallel with other scripts to improve performance for downloads. There are different ways in which the JavaScript® code that is generated can be downloaded to a client-side browser. One way is to sequentially or serially download the code, which can result in blocking Another way is to download an extensive amount of code all at once. Embodiments of the invention may employ a non-blocking download mechanism, such as fLABjs, to even the way in which the code is delivered to a user's browser. fLABjs is an on-demand parallel loader for JavaScript with execution order dependencies. For example, there may be multiple functions, such as four or five functions, in the code that is being downloaded. Instead of downloading those functions one by one in sequence, embodiments of the invention may employ the non-blocking mechanism to download multiple functions at one time. Thus, multiple functions may be quickly downloaded to the client side and be usable immediately by a user who is on a particular web page.

As an illustration of the advantage of the non-blocking mechanism for embodiments of the invention, assume a download of 1,000 items. It is self-apparent that downloading 1,000 items one by one will take a considerably longer time than downloading the 1,000 items, for example, ten at a time. That difference in download time is important to a user who may be waiting for the 1,000 items to downloaded. Assume also that one of the larger things being downloaded is one of the user's widgets. It is very important for the user to have everything happening at run time. When a tag for embodiments of the invention is invoking, it is checking the attributes of the tag, for example, to see if there are any rules associated with the tag. In creating the visual component, different users may see different widgets based on such rules. Thus, it is important to minimize the time required to download the component to the user's client-side browser. There may be so many attributes associated with a particular tag that, absent the RIA tags for embodiments of the invention, the download would take an unacceptably long time.

Embodiments of the invention provide improved server-side developer productivity due to the fact that it is not necessary for developers to write sophisticated JavaScript® code. Further, developers are already familiar with the JavaServer® Pages tag syntax. Absent the automated download and rule behavior features of the code, such as JavaScript code, for embodiments of the invention, it would be necessary for a developer to manually recreate, for example, the JavaScript® code on the client-side page. Further, it would not be possible for the business to control the behavior of a widget, the widget would not repeatable, and the widget could not be cached. Instead, the widget would have to be recreated over and over again, and an unreasonably large number of developers would be required for that task.

According to embodiments of the invention, all properties are passed into the tags by passing simples names. Widgets are controlled by properties, which may, in turn, be controlled by a business. Tags may be used directly by a business without developer involvement, in that the business may put the tags in content for a web page. Developers, may use tags to create widgets, but the widgets are still under the control of the business by virtue of the business' control of the behavior of the widgets. That is because the properties that control the widgets are not hard-coded. Instead, those properties are an indirect mechanism by which a certain property is given a certain name. The actual value that is substituted at run time from that name to a particular value is specified in the content management system by the business.

In embodiments of the invention, all interactions with widgets are handled in a decoupled way by registering event handlers. Assume, for example, that a widget is a user interface component on a page that has a balance, such as a checking balance, for a user. Assume also that the user interface component is a data grid with columns that appears as a table with various kinds of data. Assume further that the user clicks on an element of the user interface to make a transfer to or from an account that results in a change in the balance data. In the past, it was not possible to update the balance data after the transfer without refreshing the entire page. Instead, it was necessary to refresh the entire page to get the new data.

Figure 3:
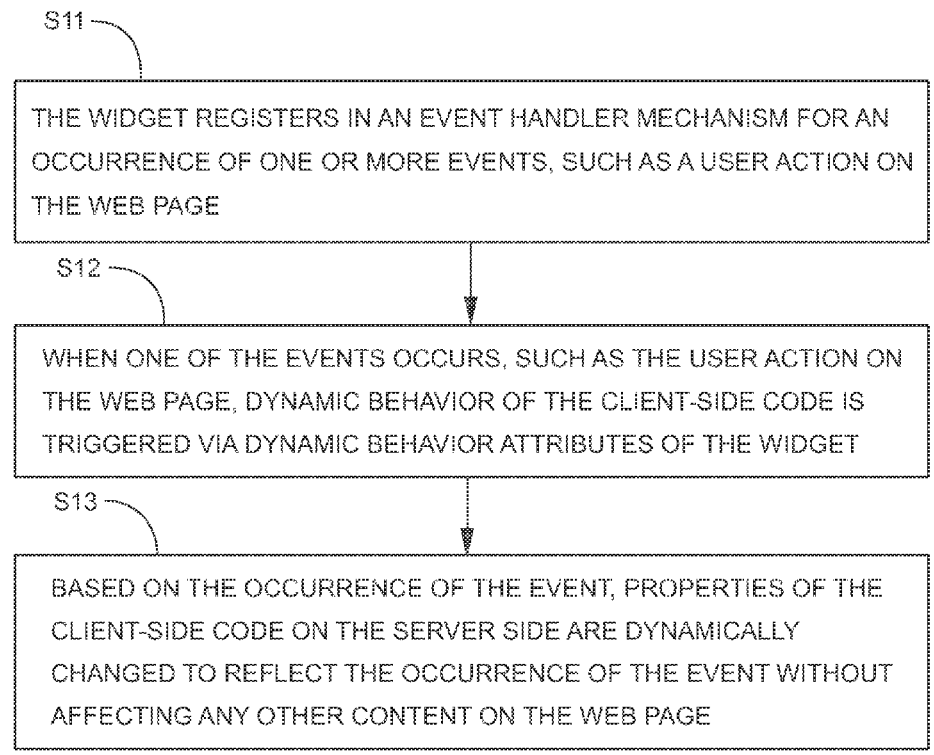
FIG. 3 is a flow chart that illustrates an example of process of triggering dynamic behavior for of the client-side code for embodiments of the invention.

FIG. 3 is a flow chart that illustrates an example of process of triggering dynamic behavior for of the client-side code for embodiments of the invention. Referring to FIG. 3, at S11 the widget registers in an event handler mechanism for an occurrence of one or more events, such as a user action on the web page. At S12, when one of the events occurs, such as the user action on the web page, dynamic behavior of the client-side code is triggered via dynamic behavior attributes of the widget. At S13, based on the occurrence of the event, properties of the client-side code on the server side are dynamically changed to reflect the occurrence of the event without affecting any other content on the web page.

Referring again, the widget may register for various events with the event handler mechanism, at S11, and is always listening on such events. Such an event may include, for example, a change in a balance or a change in a specific object or the user clicking on a particular link. In the case of a change in the balance, the widget listens for the occurrence of the change in the balance, and when it occurs, the widget automatically updates its content to reflect the new balance. Without such event handling capability, it would be necessary, for example, to provide code to scan through all possibilities in all places in which there is balance and then update the balance. In embodiments of the invention, the widget itself (i.e., the balance) listens for the event to occur and eliminates that necessity.

Embodiments of the invention provide high quality and stability of generated code because multiple developers can exercise the same code, and any changes to the code take effect immediately. As previously noted, in the past, each developer was required to regenerate code repeatedly in a time consuming and error prone process. An analogy may be, for example, giving people who want to travel back and forth between point A and point B a blue print and requiring them each to create his or her own automobile repeatedly for each trip, as opposed to allowing each person to simply buy an automobile. Such an exercise would likewise be very time consuming and error prone. Embodiments of the invention may encapsulate various complex features into tags that may be only two or three lines of code rather than hundreds of lines of code as in the past. By encapsulating such features in just a few lines of code that is required to be produced only once, the code for embodiments of the invention may be completely tested and its quality assured, so that all one has to do is invoke the code and use it.

The properties of RIA applications for embodiments of the invention may be dynamically changed on the server side based on information in the user session and immediately downloaded in the main body of each page. The dynamic rule-based mechanism for embodiments of the invention does not simply provide a widget. It provides a widget that always looks the same. For example, when a customer with greater privileges logs on, the customer may be provided a widget that is prettier. A customer with fewer privileges may be provided with a widget that is not as pretty. Thus, in a run time capability of embodiments of the invention, a dynamic change may occur on the server side based on information in the user session, and it is immediately downloaded in the main body of each page. It is not something that must be pre-built in advance. As the user logs in, it is not known who the user is. However, as the user logs in, the user provides information, such as the username, password, and/or PIN, and a widget is provided specifically for the particular user based on that information.

Embodiments of the invention may use JavaServer® Pages 2.0 tags file to speed up the development of tags as opposed to the cumbersome JavaServer® Pages custom tags. Thus, the tags for embodiments of the invention may leverage an industry standard that allows more properties and capabilities, such as event handling and dynamic attributes, than was previously feasible. Further, embodiments of the invention may run inside any application server and are are not tied to any particular vendor's specific platform. In addition, embodiments of the invention may allow ubiquitous Web 2.0 programming in which HTML structure may be separated from behavior. HTML may be generated using any technique such as tags based on personalization rules or may come from a content management system. In the past, tags have generally included HTML and were basically very static. The tags for embodiments of the invention create dynamic behavior of client-side code.

RIA components may be triggered by some user action, such as a transfer or a payment. The tags for embodiments of the invention allow changes without impacting other things on a web page. Such tags may be based on personalization rules which may prescribe, for example, a level of privileges to which a particular customer is entitled or in what language the particular customer wishes to transact. Depending on the way in which the customer comes to the business's web site, the widget for embodiments of the invention may change the content. The widget code does not change but the widget knows, for example, that a particular customer prefers to transact in a certain language and changes the content accordingly. Such personalization rules may be controlled by the business via a content management system.

In embodiments of the invention, code may be generated repeatedly on the server and downloaded each time in the main body of a web page. Alternatively, code may be created once and cached for all users to download. While the code for a particular widget may be generated repeatedly, if the widget is affected by user behavior there may be no point to generating it repeatedly and wasting precious computing capacity. Instead, the code may be created once and cached and used again when it is needed. In embodiments of the invention, the generated code may be downloaded to the browser using a standard browser JavaScript® download mechanism. The delivery mechanism for embodiments of the invention sends code to the browser in the exact spot on a web page where it is intended to be located.

Figure 4:
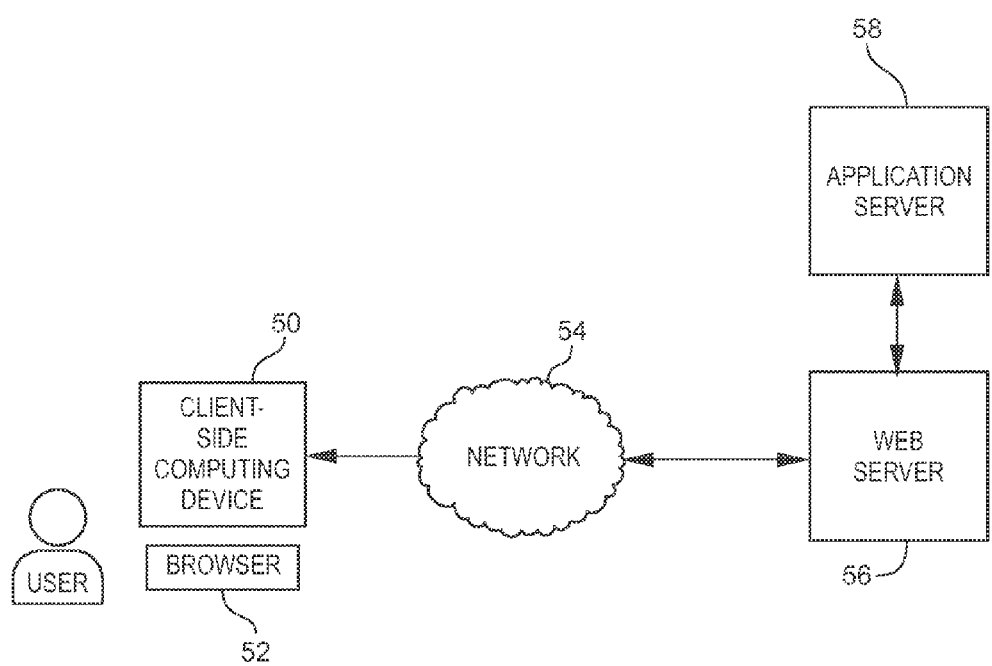
FIG. 4 is a schematic diagram which illustrates an example of components for a web application for embodiments of the invention.

Code for embodiments of the invention may always be served from an application server instead of a web server. In a typical architecture for web applications, there may be a web server, an application server and sometimes a database. In such an architecture, web pages are often created from the web server. FIG. 4 is a schematic diagram which illustrates an example of components for a web application for embodiments of the invention. Referring to FIG. 4, such components may include, for example, a client-side computing device 50 with a browser 52 coupled over a network 54, such as the Internet, to a web server 56. The web server 56 may, in turn, be coupled to an application server 58.

Referring to FIG. 4, in embodiments of the invention, web pages are created from the application server 58, which provides the additional session control of caching and clean up. Caching is important because of the reuse of the widgets for embodiments of the invention. For example, assume that there are twenty widgets on a page. When a widget is later invoked, it is important to know whether or not it is a widget that was previously invoked. Thus, it is necessary to track that and to know exactly which ones of those twenty widgets are cached and which ones are not cached. Even among those that are cached, it is necessary to know which one is invoked so that it can be delivered again instead of mistakenly delivering another one. The application server 58 has the capability for such session control of caching.

Cleanup is another important function for embodiments of the invention. When widgets are repeatedly cached, memory consumption may be excessive, which can be a problem for application server performance. Thus, optimal cleanup of the cache is important to enable caching to continue. Typically, cleanup of the cache involves removal of the least frequently used code. Referring again to FIG. 4, a request from a user's browser 52 may typically go first to the web server 56 and then to the application server 58. The code is produced by the application server 58 and may be sent to the browser 52 via the web server 56. However, the web server 56 does nothing but serve as a conduit between the application server 58 and the browser 52 for the code requested by the browser 52 and produced by the application server.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that my be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for generating dynamic web page components, comprising:
    automatically generating, by a server-side processor, client-side code for content of a web page embedded with at least one tag with dynamic behavior attributes for a widget within the code for the content of the web page at run time;
    automatically downloading, by the server-side processor, the client-side code embedded with the at least one tag to a client-side processor at run time;
    executing, by the client-side processor, the client-side code embedded with the at least one tag to become a widget with dynamic behavior attributes displayed as a component of the web page on a display screen of a client-side computing device;
    triggering dynamic behavior of the client-side code on the client-side processor via the dynamic behavior attributes of the widget by an occurrence of an event at the client-side processor based at least in part on a user interaction with the client-side processor and personalization rules; and
    caching, by the client-side processor, the code for the content of the web page embedded with the at least one tag according to a tag parameter when no change is implemented in the widget by said occurrence of the event at the client-side processor or caching, by the server-side processor, the code for the content of the web page embedded with the at least one tag according to the tag parameter when a change in the widget is implemented by said occurrence of the event at the client-side processor.

2. The method of claim 1, wherein automatically generating the client-side code on the server at run time further comprises providing a tag that is executable on the server at run time to create the client-side code.

3. The method of claim 2, wherein providing the tag that is executable on the server at run time to create the client-side code further comprises embedding the tag within content for the web page using a content management system.

4. The method of claim 2, wherein providing the tag that is executable on the server at run time to create the client-side code further comprises providing the tag that is executable on the server at run time to create client-side widget code.

5. The method of claim 1, wherein automatically generating the client-side code on the server at run time further comprises automatically generating the client-side code on the server at run time that is executable on the client side.

6. The method of claim 5, wherein automatically generating the client-side code on the server at run time that is executable on the client side further comprises automatically generating the client-side code on the server at run time that is executable on a client-side browser.

7. The method of claim 6, wherein automatically generating the client-side code on the server at run time that is executable on the client-side browser further comprises automatically generating the client-side code by a tag at run time, the client-side code being executable on the client-side browser.

8. The method of claim 7, wherein automatically generating the client-side code by the tag at run time further comprises automatically generating the client-side code by the tag at run time that is executable on the client-side browser as a component of the web page with dynamic behavior.

9. The method of claim 8, wherein automatically generating the client-side code by the tag at run time further comprises automatically generating the client-side code by the tag at run time that is executable on the client-side browser as the component of the web page with dynamic behavior that refreshes itself.

10. The method of claim 9, wherein automatically generating the client-side code by the tag at run time further comprises automatically generating rich Internet application code that is executable on the client-side browser as the component of the web page with dynamic behavior that refreshes itself.

11. The method of claim 1, wherein automatically downloading the client-side code to the client side at run time further comprises automatically downloading multiple functions in the client-side code simultaneously to the client side using a non-blocking mechanism.

12. The method of claim 11, wherein automatically downloading the multiple functions in the client-side code simultaneously to the client side using the non-blocking mechanism further comprises automatically downloading the multiple functions in the client-side code simultaneously to the client side using a JavaScript non-blocking mechanism.

13. The method of claim 1, wherein executing the client-side code on the client side to become a widget displayed as a component of a web page further comprises executing the code on the client side to become a widget displayed as a main body of the web page on the display screen of the computing device.

14. The method of claim 1, wherein triggering the dynamic behavior of the client-side code via the dynamic behavior attributes of the widget by the occurrence of the at least one event further comprises triggering the dynamic behavior of the client-side code by the occurrence of a user action on the web page.

15. The method of claim 14, wherein triggering the dynamic behavior of the client-side code by the occurrence of the user action on the web page further comprises triggering the dynamic behavior of a rich Internet application component by the occurrence of the user action on the web page.

16. The method of claim 1, wherein triggering the dynamic behavior of the client-side code via the dynamic behavior attributes of the widget by an occurrence of the at least one event further comprises dynamically changing properties of the client-side code on the server side based on the occurrence of the at least one event.

17. The method of claim 1, wherein triggering the dynamic behavior of the client-side code via the dynamic behavior attributes of the widget by an occurrence of the at least one event further comprises automatically updating content of the widget by the widget to reflect the occurrence of the at least one event.

18. The method of claim 17, wherein automatically updating the content of the widget by the widget to reflect the occurrence of the at least one event further comprises automatically updating content of the widget by the widget to reflect the occurrence of the at least one event without affecting any other content on the web page.

19. The method of claim 1, wherein triggering the dynamic behavior of the client-side code via the dynamic behavior attributes of the widget by an occurrence of the at least one event further comprises registering by the widget in an event handler mechanism for the occurrence of the at least one event.

20. The method of claim 1, further comprising redisplaying the widget as a component of the web page on a subsequent occasion without regenerating the client-side code.

21. The method of claim 20, wherein redisplaying the widget as the component of the web page on a subsequent occasion without regenerating the client-side code further comprises redisplaying the widget from the server as a component of the web page on the subsequent occasion with a change in the widget without regenerating the client-side code.

22. A non-transitory computer-readable storage medium with an executable program stored thereon for generating dynamic web page components, wherein the program instructs one or more microprocessors to perform the steps of:
    automatically generating, on a server-side microprocessor, client-side code for content of a web page embedded with at least one tag with dynamic behavior attributes for a widget within the code for the content of the web page at run time;
    automatically downloading the client-side code embedded with the at least one tag to a client-side microprocessor at run time;
    executing, on the client-side microprocessor, the client-side code embedded with the at least one tag to become a widget with dynamic behavior attributes displayed as a component of the web page on a display screen of a client-side computing device;
    triggering dynamic behavior of the client-side code on the client-side microprocessor via the dynamic behavior attributes of the widget by an occurrence of an event at the client-side processor based at least in part on a user interaction with the client-side microprocessor and personalization rules; and
    caching, on the client-side microprocessor, the code for the content of the web page embedded with the at least one tag according to a tag parameter when no change is implemented in the widget by said occurrence of the event at the client-side microprocessor or caching, on the server-side microprocessor, the code for the content of the web page embedded with the at least one tag according to the tag parameter when a change in the widget is implemented by said occurrence of the event at the client-side microprocessor.

23. A system for generating dynamic web page content, comprising:
    a server-side processor coupled to memory and being programmed for:
        automatically generating client-side code for content of a web page embedded with at least one tag with dynamic behavior attributes for a widget within the code for the content of the web page at run time;
        automatically downloading the client-side code embedded with the at least one tag to a client-side processor at run time;
    a client-side processor coupled to memory and being programmed for:
        executing the client-side code embedded with the at least one tag to become a widget with dynamic behavior attributes displayed as a component of the web page on a display screen of a client-side computing device;
        triggering dynamic behavior of the client-side code on the client-side processor via the dynamic behavior attributes of the widget by an occurrence of an event at the client-side processor based at least in part on a user interaction with the client-side processor and personalization rules;
        caching, on the client-side processor, the code for the content of the web page embedded with the at least one tag according to a tag parameter when no change is implemented in the widget by said occurrence of the event at the client-side processor; and
    the server-side processor being further programmed for:
        caching, on the server-side processor, the code for the content of the web page embedded with the at least one tag according to the tag parameter when a change in the widget is implemented by said occurrence of the event at the client-side processor.

* * * * *